United States Patent
Gupta et al.

(10) Patent No.: US 11,553,527 B2
(45) Date of Patent: Jan. 10, 2023

(54) METHOD AND SYSTEM FOR HANDLING RANDOM ACCESS PROCEDURE IN NON-TERRESTRIAL COMMUNICATION SYSTEM

(71) Applicant: Samsung Electronics Co., Ltd., Suwon-si (KR)

(72) Inventors: Ekansh Gupta, Bangalore (IN); Abhishek Kumar Singh, Bangalore (IN); Youngbin Chang, Suwon-si (KR); Anil Agiwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 15/734,178

(22) PCT Filed: Jun. 3, 2019

(86) PCT No.: PCT/KR2019/006674
§ 371 (c)(1),
(2) Date: Dec. 1, 2020

(87) PCT Pub. No.: WO2019/231305
PCT Pub. Date: Dec. 5, 2019

(65) Prior Publication Data
US 2021/0168869 A1    Jun. 3, 2021

(30) Foreign Application Priority Data

Jun. 1, 2018 (IN) .............................. 201841020670
May 29, 2019 (IN) .............................. 201841020670

(51) Int. Cl.
*H04W 74/08* (2009.01)
*H04W 76/11* (2018.01)
(Continued)

(52) U.S. Cl.
CPC ..... *H04W 74/0833* (2013.01); *H04L 27/2607* (2013.01); *H04W 24/08* (2013.01);
(Continued)

(58) Field of Classification Search
CPC ............. H04W 74/0833; H04W 24/08; H04W 56/005; H04W 76/11; H04W 84/06;
(Continued)

(56) References Cited

U.S. PATENT DOCUMENTS 10,547,374 B1 *   1/2020   Liu ........................ H04W 72/14
2015/0181544 A1    6/2015   Liu et al.
(Continued)

FOREIGN PATENT DOCUMENTS

WO    2017/069570 A1    4/2017
WO    2017/194018 A1    11/2017

OTHER PUBLICATIONS

"3rd Generation Partnership Project; Technical Specification Group Radio Access Network; Study on New Radio (NR) to support non terrestrial networks (Release 15)", 3GPP TR 38.811 V0.3.0 (Dec. 2017), 56 pages.
(Continued)

*Primary Examiner* — Hassan Kizou
*Assistant Examiner* — Hector Reyes

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Accordingly, the embodiments herein provides a
(Continued)

method and system method for handling a random access procedure in a Non-Terrestrial communication system (300). The method includes obtaining, by a UE (100), a default TA, a RACH resource, and a RACH configuration list. Further, the method includes selecting, by the UE (100), the default TA and the RACH resource. Further, the method includes applying, by the UE (100), the selected default TA to the random access procedure. Further, the method includes performing, by the UE (100), the random access procedure based on the selected RACH resource and the selected default TA. The proposed method can be used to reduce the CP and GT in the RACH preambles, so as to optimize the random access procedure using the default TA.

13 Claims, 15 Drawing Sheets

(51) Int. Cl.
*H04L 27/26* (2006.01)
*H04W 24/08* (2009.01)
*H04W 56/00* (2009.01)
*H04W 84/06* (2009.01)

(52) U.S. Cl.
CPC .......... *H04W 56/005* (2013.01); *H04W 76/11* (2018.02); *H04W 84/06* (2013.01)

(58) Field of Classification Search
CPC ........... H04W 56/0045; H04L 27/2607; H04B 7/18504; H04B 7/1851
See application file for complete search history.

(56) References Cited

U.S. PATENT DOCUMENTS

| | | |
|---|---|---|
| 2017/0013095 A1 | 1/2017 | Blankenship et al. |
| 2017/0359790 A1 | 12/2017 | Wang et al. |
| 2018/0310210 A1 | 10/2018 | Yi et al. |
| 2019/0141754 A1* | 5/2019 | Bai ..................... H04W 74/002 |
| 2019/0215864 A1 | 7/2019 | Yang et al. |
| 2019/0364599 A1* | 11/2019 | Islam .................... H04L 5/0048 |
| 2021/0029658 A1* | 1/2021 | Mahalingam ...... H04B 7/18513 |

OTHER PUBLICATIONS

International Search Report dated Aug. 30, 2019 in connection with International Patent Application No. PCT/KR2019/006674, 3 pages.
Written Opinion of the International Searching Authority dated Aug. 30, 2019 in connection with International Patent Application No. PCT/KR2019/006674, 4 pages.
Office Action dated May 19, 2021 in connection with India Patent Application No. 201841020670, 7 pages.

* cited by examiner

METHOD AND SYSTEM FOR HANDLING RANDOM ACCESS PROCEDURE IN NON-TERRESTRIAL COMMUNICATION SYSTEM

CROSS-REFERENCE TO RELATED APPLICATIONS

This application is a 371 of International Application No. PCT/KR2019/006674 filed on Jun. 3, 2019, which claims priority to India Patent Application No. 201841020670 filed on Jun. 1, 2018 and India Patent Application No. 201841020670 filed on May 29, 2019, the disclosures of which are herein incorporated by reference in their entirety.

BACKGROUND

1. Field

The present disclosure relates to a Random Access Procedure (RACH) in a cellular communication and an aerial communication (i.e., Non-Terrestrial Node (NTN) communication system, and more particularly related to a method and system for reducing Cyclic Prefix (CP) and Guard Time (GT) in cellular RACH preambles and optimizing random access procedure using a default Timing Advance (TA).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

RACH preamble transmission in existing Long Term Evolution (LTE)/New Radio (NR) systems involves prefixing a transmission with a CP (to compensate for multipath fading and transmission delay in Timing Advance estimation) and suffixed with a GT (to prevent RACH transmission from corrupting the subsequent transmissions).

FIG. 1 illustrates a RACH preamble structure, according to a prior art. In order to achieve these properties, CP and GT length depend on a maximum possible propagation delay from a user equipment (UE) to an enhanced NodeB (eNB)/5G NodeB (gNB). Further the CP also depends on a multipath delay spread. For an NTN deployment, the altitude of a satellite NB can range from 8 km to 36000 km thereby making the propagation delay range from a few microseconds to 100 ms. Including CP/GT for 100 s of milliseconds will be very inefficient and it will drastically reduce a number of RACH occasions available for the UEs. This is also valid for very large terrestrial network cells.

After sending a RACH preamble, the UE is supposed to monitor a Physical Downlink Control Channel (PDCCH) for downlink assignment for a Random Access Response (RAR). However, it will take the propagation delay time for the RACH preamble to reach the NB and another propagation delay time for the PDCCH to reach the UE. Hence, the minimum delay before downlink control information (DCI) can come about 2 times the propagation delay.

The length of the CP accounts for maximum propagation delay and multipath delay spread. The length of the GT accounts for the propagation delay. It is required such that an overshoot of a RACH message does not corrupt any subsequent transmission received by the NB.

FIG. 2 illustrates a typical cellular network, according to the prior art. In the typical cellular network, a length of these fields in small compared to an actual message length. FIG. 3 illustrates a system model of a Non-Terrestrial NodeB (NTNB) and the UE, according to the prior art. However as cells expand and new cellular deployments emerge (like NTN), RACH needs further optimization.

FIG. 4 illustrates a conventional RACH preamble reception at TNB, according to the prior art. In conventional random access procedure, the UE does not apply a timing advance in an msg1. Based on an arrival of a RACH request at the NB, the NB estimates Timing advance for the UE and sends it in the random access response (e.g. RAR—msg2). After receiving the msg2, the UE can calculate and apply its accurate timing advance for uplink signal transmission from the UE to the NB. If minimum distance between a nearest UE and NB is deterministic, default timing advance value (i.e. default TA) is estimated, and it is always used for the random access procedure in any network system, especially the NTN. The default TA (default TA refers to the Timing advance that UE can apply in first random access signal (e.g. PRACH preamble—msg1) itself without knowing the timing advance value from the NB owing to a lot of factors including but not limiting to a guaranteed minimum delay.

Currently, after transmitting the RACH preamble, the UE is supposed to start monitoring the PDCCH for receiving downlink assignment for the RAR. However for the RACH preamble to reach and a corresponding DCI to arrive at the UE it will take at least twice the propagation delay time. Hence, the UE can start monitoring the PDCCH after a delay dependent on the propagation delay from the UE to the NB. The same argument is valid for monitoring for downlink assignment corresponding to msg4 after msg3 transmission.

FIG. 5 illustrates a default TA based RACH preamble reception, according to the prior art. Delay calculation for different points is given below:

$$T_{TNB} = \frac{r}{v_c} \quad v_c\text{: Speed of light}$$

$$T_h = \frac{h}{v_c} \quad \text{Min} \cdot \text{delay}$$

$$T_{NTNB} = \frac{\sqrt{r^2 + h^2}}{v_c} \quad \text{Max} \cdot \text{delay}$$

Thus, it is desired to address the above mentioned disadvantages or other shortcomings or at least provide a useful alternative.

SUMMARY

Accordingly, the embodiments herein disclose a method for handling a random access procedure in a Non-Terrestrial communication system. The method includes obtaining, by a UE, a default TA, a RACH resource, and a RACH configuration list. Further, the method includes selecting, by the UE, the default TA and the RACH resource. Further, the method includes applying, by the UE, the selected default TA to the random access procedure. Further, the method includes performing, by the UE, the random access procedure based on the selected RACH resource and the selected default TA.

In an embodiment, selecting, by the UE, the default TA and the RACH resource includes determining, by the UE, whether a height of the UE and beam information are available, receiving, by the UE, information corresponding to the default TA, the beam information, variable height ranges of the UE, at least one RACH resource pool associated with combination of the variable height ranges of the UE and the beam information, at least one CP length associated with the RACH preamble, at least one GT length associated with the RACH preamble, RACH preamble resources from a base station through a message, configuring, by the UE, the at least one CP length associated with the RACH preamble and the at least one GT length associated with the RACH preamble based on the default TA and combination of the variable height ranges of the UE and the beam information in response to determining that the height of the UE and the beam information are available, and selecting, by the UE, the default TA and the RACH resource.

In an embodiment, selecting, by the UE, the default TA and the RACH resource includes determining, by the UE, whether a height of the UE and beam information are available, receiving, by the UE, information corresponding to the default TA, a RAR window, the at least one RACH resource pool, the at least one CP length associated with the RACH preamble resource, and the at least one GT length associated with the RACH preamble resource from the base station through the message in response to determining that the height of the UE and the beam information are not available, and selecting, by the UE, the default TA and the RACH resource.

In an embodiment, selecting, by the UE, the default TA and the RACH resource includes determining, by the UE, whether a height of the UE and beam information are available, receiving, by the UE, information corresponding to the default TA, a height of the UE, a capability of the UE, a random access response (RAR) window, the at least one RACH resource pool associated with the variable height ranges of the UE (100), the at least one CP length associated with the UE, the at least one GT length associated with the UE, the RACH preamble resources from the base station through the message in response to determining that the height of the UE is available and the beam information is not available, and selecting, by the UE, the default TA and the RACH resource.

In an embodiment, the message includes at least one of a Master Information Block (MIB), a System Information Block (SIB), and a Radio Resource Control (RRC) configuration message.

In an embodiment, the method further includes waiting, by the UE, a predefined time prior to initiate a response window based on the default TA. Further, the method includes monitoring, by the UE, a Physical Downlink Control Channel (PDCCH) for the DCI for the RAR.

In an embodiment, the method further includes determining, by the UE, that a timing advance value is less than the default TA after calculating a RAR reception. Further, the method includes considering, by the UE, a RACH failure, and restarting, by the UE, the RACH procedure.

In an embodiment, the method further includes waiting, by the UE, for a time duration prior to starting a timer based on a predefined timing advance value calculated after a RAR reception based on the default TA. Further, the method includes monitoring, by the UE, a PDCCH for the DCI, wherein the PDCCH corresponds to a Cell-Radio Network Temporary Identifier C-RNTI/Temporary cell-Radio Network Temporary Identifier (TC-RNTI). Further, the method includes stopping, by the UE, the timer and PDCCH monitoring.

In an embodiment, selecting, by the UE, the default TA and the RACH resource includes acquiring, by the UE, a synchronization timing from a downlink reference signal and random access information including the default TA, sending, by the UE, the random access information using the default TA, and selecting, by the UE, the default TA and the RACH resource based on the random access information.

In an embodiment, selecting, by the UE, the default TA and the RACH resource includes mapping one of a list of default TA, a list of RACH resource, and a list of RACH preamble structure to one of Synchronization Signal Block (SSB) information and a Channel State Information Reference Signal (CSI-RS), and selecting the default TA and the RACH resource based on the mapping.

In an embodiment, selecting the default TA and the RACH resource includes computing the default TA based on a TA received from the base station during the RAR previously received from the base station (200), and selecting the default TA and the RACH resource based on the computation, wherein the default TA is computed based on the RAR which is indicated to neighboring UE for the random access procedure via a device to device communication.

Accordingly, the embodiments herein disclose a method for handling a random access procedure in a Non-Terrestrial communication system. The method includes estimating, by a base station, a minimum propagation delay using at least one of altitude information and beam information. Further, the method includes determining, by the base station, a default TA based on the minimum propagation delay. Further, the method includes creating a pool of a RACH resource, and RACH preamble, a CP length associated with the RACH resource, the GT length associated with the RACH resource based on the default TA value. Further, the method includes transmitting, by the base station, the default TA and information to a UE over a message.

In an embodiment, the information comprises one of a first set of parameter comprising a RAR window, at least one RACH resource pool, at least one CP length, at least one GT length, and a RACH preamble resource, a second set of parameter comprising a type of the UE, the RAR window, the at least one RACH resource pool, the at least one CP length, and the at least one GT length, and a third set of parameter comprising the beam information, the at least one RACH resource pool, the at least one CP length, the at least one GT length, and the RACH preamble resource.

Accordingly, the embodiments herein disclose a UE for handling a random access procedure in a Non-Terrestrial communication system. The UE includes a processor coupled with a memory. The processor is configured to obtain a default TA, a RACH resource, and a RACH configuration list. Further, the processor is configured to select the default TA and the RACH resource and apply the selected default TA to the random access procedure. Further, the processor is configured to perform the random access procedure based on the selected RACH resource and the selected default TA.

Accordingly, the embodiments herein disclose a base station for handling a random access procedure in a Non-Terrestrial communication system. The base station includes a processor coupled with a memory. The processor is configured to estimate a minimum propagation delay using at least one of altitude information and beam information. Further, the processor is configured to determine a default TA based on the minimum propagation delay. Further, the processor is configured to create a pool of a RACH resource, RACH preamble, a CP length associated with the RACH resource, and the GT length associated with the RACH resource based on the default TA. Further, the processor is configured to transmit the default TA and information to a User Equipment (UE) over a message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method and system for reducing CP and GT in cellular RACH preambles and optimizing random access procedure using a default TA.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
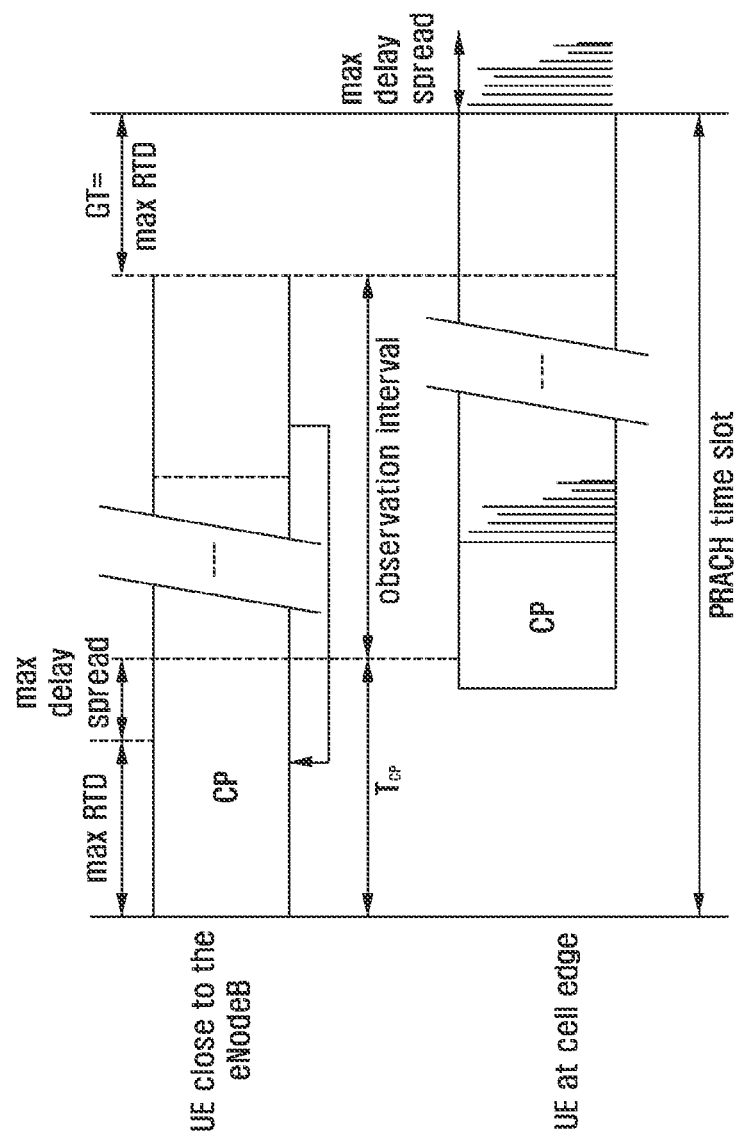
FIG. 1 illustrates a RACH preamble structure, according to a prior art.
Figure 2:
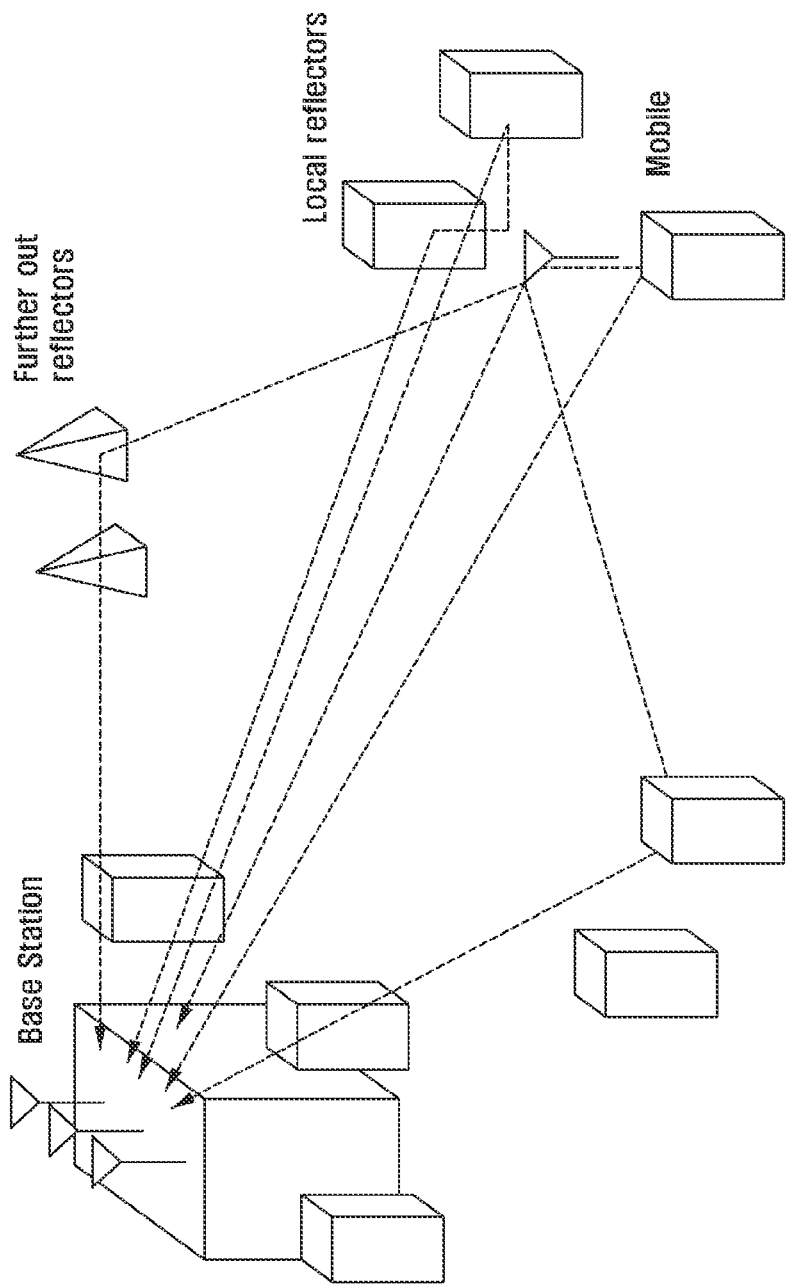
FIG. 2 illustrates a typical cellular network, according to the prior art.
Figure 3:
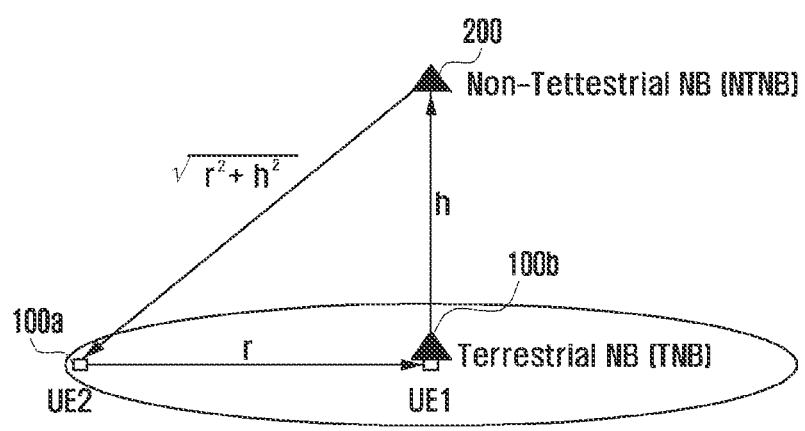
FIG. 3 illustrates a system model of a NTNB and a UE, according to the prior art.
Figure 4:
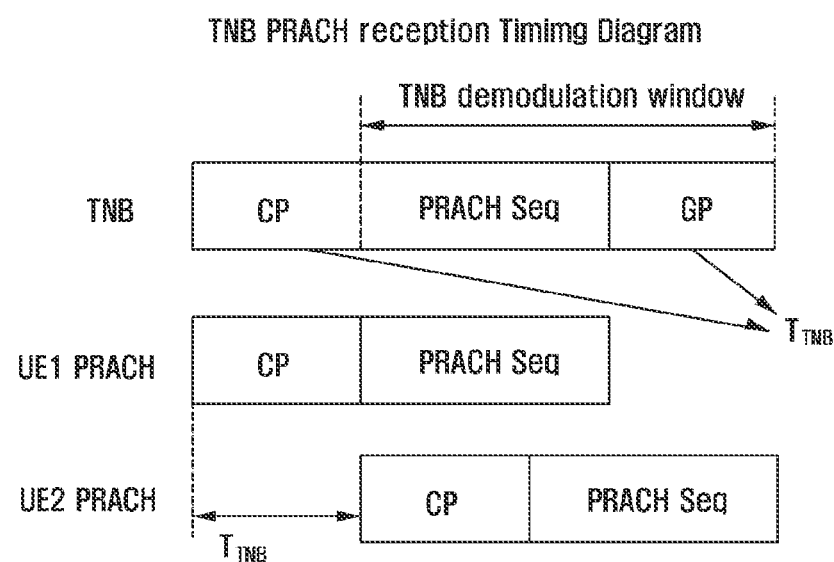
FIG. 4 illustrates a conventional RACH preamble reception at TNB, according to the prior art.
Figure 5:
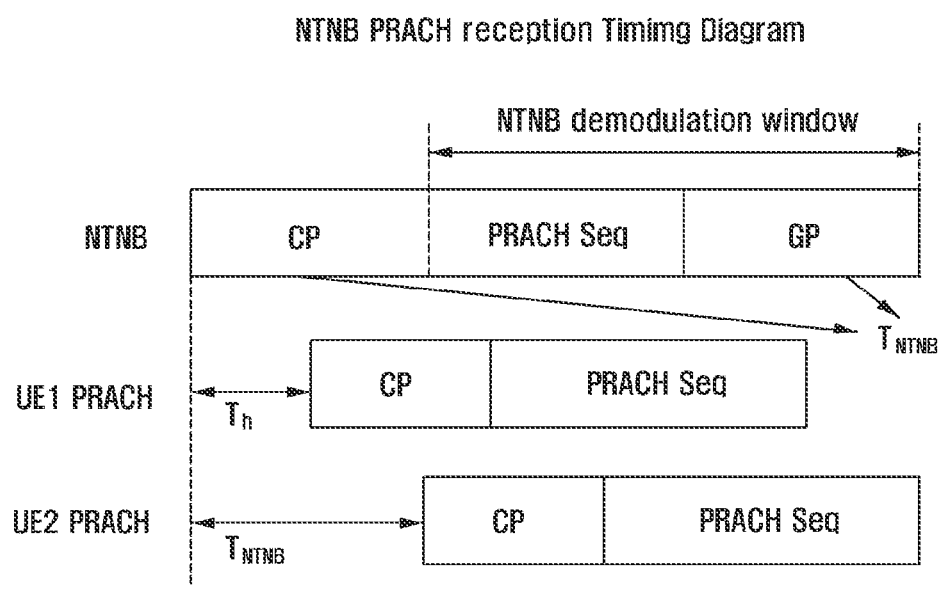
FIG. 5 illustrates a default TA based RACH preamble reception, according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provides a method for handling a random access procedure in a Non-Terrestrial communication system. The method includes obtaining, by a UE, a default TA, a RACH resource, and a RACH configuration list. Further, the method includes selecting, by the UE, the default TA and the RACH resource. Further, the method includes applying, by the UE, the selected default TA to the random access procedure. Further, the method includes performing, by the UE, the random access procedure based on the selected RACH resource and the selected default TA.

Unlike convention methods and systems, the proposed method can be used to reduce the CP and GT in the RACH preambles, so as to optimize the random access procedure using a default timing advance. In the proposed methods, the monitoring window can also be reduced and thus also help in power saving of the UE.

Referring now to the drawings, and more particularly to FIGS. 6 through 10, where similar reference characters denote corresponding features consistently throughout the figures, there are shown preferred embodiments.

Figure 6A:
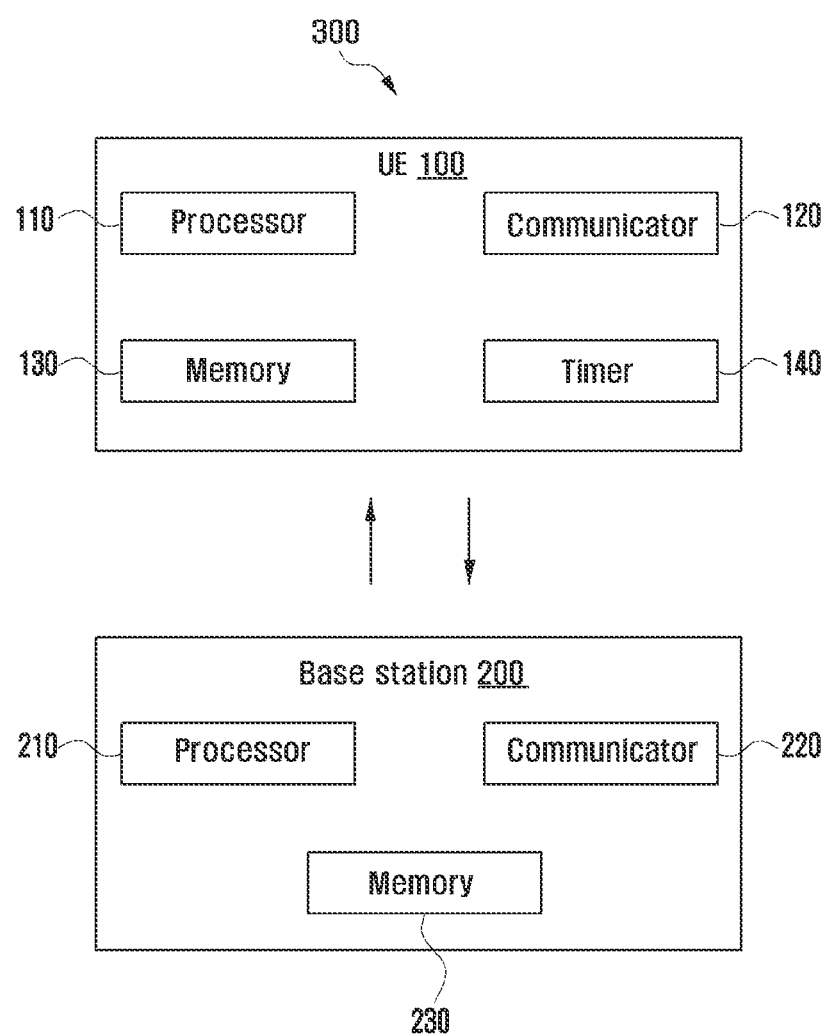
FIG. 6a illustrates a schematic overview of a Non-Terrestrial communication system for handling a random access procedure, according to the embodiments as disclosed herein.

FIG. 6a illustrates a schematic overview of a Non-Terrestrial communication system (300) for handling a random access procedure, according to the embodiments as disclosed herein. In an embodiment, the Non-Terrestrial communication system (300) includes a UE (100) and a base station (200). The UE (100) can be, for example but not limited to a Unmanned Aerial Vehicle (UAV), an airplane, a cellular phone, a tablet, a smart phone, a laptop, a Personal Digital Assistant (PDA), a global positioning system, a multimedia device, a video device, an internet of things (IoT) device, a smart watch, a game console, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB or the like.

In an embodiment, the UE includes a processor (110), a communicator (120), a memory (130) and a timer (140). The processor (110) is coupled with the communicator (120), the memory (130) and the timer (140). In an embodiment, the processor (110) is configured to obtain a default TA, a RACH resource, and a RACH configuration list. Further, the processor (110) is configured to select the default TA and the RACH resource.

In an embodiment, the processor (110) is configured to determine whether a height of the UE (100) and beam information are available. Further, the processor (110) is configured to receive information corresponding to the default TA, the beam information, variable height ranges of the UE (100), at least one RACH resource pool associated with combination of the variable height ranges of the UE (100) and the beam information, a CP length associated with the RACH preamble, a GT length associated with the RACH preamble, RACH preamble resources from a base station (200) through a message, and configure the CP length associated with the RACH preamble and the GT length associated with the RACH preamble based on the default TA and the combination of the variable height ranges of the UE (100) and the beam information in response to determining that the height of the UE (100) and the beam information are available. Further, the processor (110) is configured to select the default TA and the RACH resource based on the determination.

In an embodiment, the processor (110) is configured to determine whether the height of the UE (100) and beam information are available. Further, the processor (110) is configured to receive information corresponding to the default TA, a RAR window, the RACH resource pool, the CP length associated with the RACH preamble resource, and the GT length associated with the RACH preamble resource from the base station (200) through the message in response to determining that the height of the UE (100) and the beam information are not available. Further, the processor (110) is configured to select the default TA and the RACH resource based on the determination.

In an embodiment, the processor (110) is configured to determine whether a height of the UE (100) and beam information are available. Further, the processor (110) is configured to receive information corresponding to the default TA, the height of the UE, the capability of the UE, the random access response (RAR) window, a RACH resource pool associated with the variable height ranges of the UE (100), a CP length associated with the UE (100), the GT length associated with the UE (100), the RACH preamble resources from the base station (200) through the message in response to determining that the height of the UE (100) is available and the beam information is not available. Further, the processor (110) is configured to select the default TA and the RACH resource based on the determination.

In an embodiment, the processor (110) is configured to determine whether the height of the UE (100) and beam information are available. Further, the processor (110) is configured to receive information corresponding to the default TA, the RACH resource pool, the CP length associated with the beam information, the GT length associated with the beam information, and the RACH preamble resource from the base station (200) through the message in response to determining that the height of the UE (100) is not available and the beam information is available. Further, the processor (110) is configured to select the default TA and the RACH resource based on the determination.

Further, the processor (110) is configured to apply the selected default TA to the random access procedure. Further, the processor (110) is configured to perform the random access procedure based on the selected RACH resource and the selected default TA.

In an embodiment, the message comprises at least one of a Master Information Block (MIB), a System Information Block (SIB), and a Radio Resource Control (RRC) configuration message.

In an embodiment, the processor (110) is configured to wait a predefined time prior to initiate a response window based on the default TA. Further, the processor (110) is configured to monitor a PDCCH for a DCI for the RAR.

In an embodiment, the processor (110) is configured to determine that a timing advance value is less than the default TA after calculating a RAR reception. Further, the processor (110) is configured to consider a RACH failure, and restart the RACH procedure.

In an embodiment, the processor (110) is configured to wait for a time duration prior to starting the timer (140) based on an accurate timing advance value calculated after a RAR reception based on the default TA. Further, the processor (110) is configured to monitor a PDCCH for DCI, where the PDCCH corresponds to a Cell-Radio Network Temporary Identifier C-RNTI/Temporary cell-Radio Network Temporary Identifier (TC-RNTI). Further, the processor (110) is configured to stop the timer (140) and PDCCH monitoring.

The processor (110) is configured to execute instructions stored in the memory (130) and to perform various processes. The communicator (120) is configured for communicating internally between internal hardware components and with external devices via one or more networks.

The memory (130) stores instructions to be executed by the processor 140. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

In an embodiment, the base station (200) includes a processor (210), a communicator (220), and a memory (230). The processor (210) is coupled with the communicator (220) and the memory (230). The processor (210) is configured to estimate a minimum propagation delay using at least one of altitude information and beam information. Further, the processor (210) is configured to determine the default TA based on the minimum propagation delay. Further, the processor (210) is configured to create a pool of a RACH resource, and RACH preamble, the CP length associated with the RACH resource, the GT length associated with the RACH resource based on the default TA. Further, the processor (210) is configured to transmit the default TA and information to the UE (100) over the message. In an embodiment, the information includes one of a first set of parameter comprising a RAR window, a RACH resource pool, a CP length, a GT length, and a RACH preamble resource, a second set of parameter comprising a type of the UE, the RAR window, the RACH resource pool, the CP length, and the GT length, and a third set of parameter comprising the beam information, the RACH resource pool, the CP length, GT length, and the RACH preamble resource.

The processor (210) is configured to execute instructions stored in the memory (230) and to perform various processes. The communicator (220) is configured for communicating internally between internal hardware components and with external devices via one or more networks.

The memory (230) stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In some examples, the memory (230) can be configured to store larger amounts of information than the memory. In certain examples, a non-transitory storage medium may store data that can, over time, change (e.g., in Random Access Memory (RAM) or cache).

Although the FIG. 6a shows various hardware components of the Non-Terrestrial communication system (300) but it is to be understood that other embodiments are not limited thereon. In other embodiments, the Non-Terrestrial communication system (300) may include less or more number of components. Further, the labels or names of the components are used only for illustrative purpose and does not limit the scope of the invention. One or more components can be combined together to perform same or substantially similar function to handle the random access procedure.

Figure 6B:
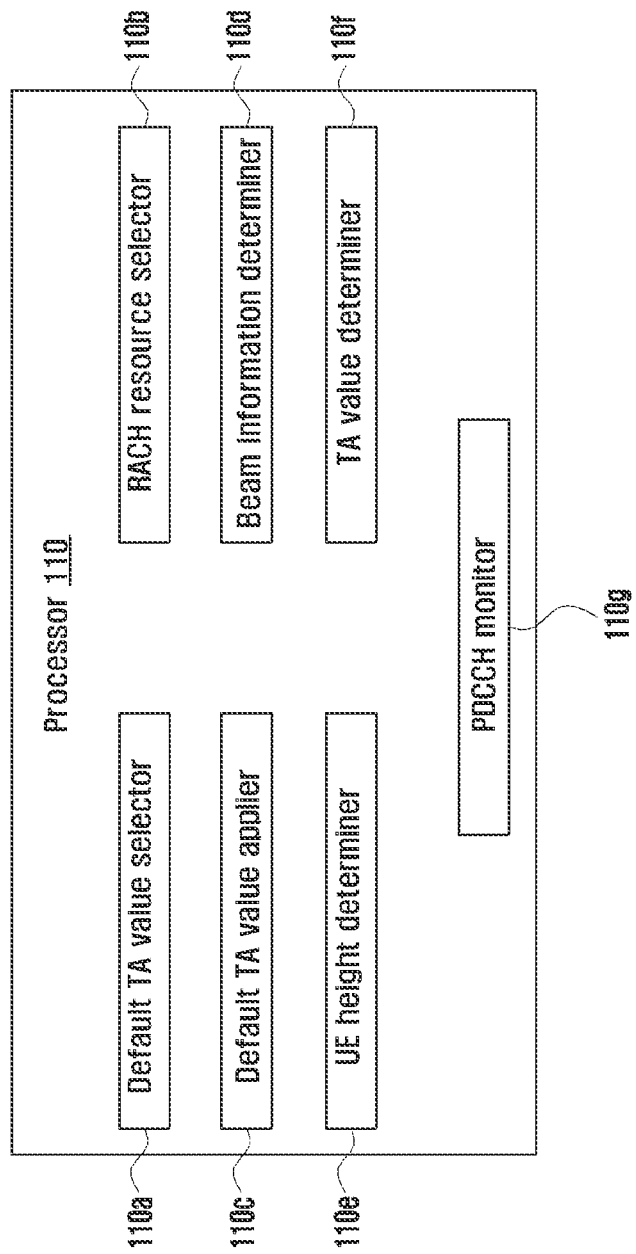
FIG. 6b illustrates various elements in a processor included in the UE, according to the embodiments as disclosed herein.

FIG. 6b illustrates various elements in the processor (110) included in the UE (100), according to the embodiments as disclosed herein.

In an embodiment, the processor (110) includes a default TA value selector (110a), a RACH resource selector (110b), a default TA value applier (110c), a beam information determiner (110d), a UE height determiner (110e), a TA value determiner (110f) and a PDCCH monitor (110g). The default TA value selector (110a) and the RACH resource selector (110b) obtain the default TA, the RACH resource, and the RACH configuration list. Further, the default TA value selector (110a) and the RACH resource selector (110b) selects the default TA and the RACH resource. The beam information determiner (110d) determines that beam information are availability and the UE height determiner (110e) determines the height of the UE. Based on the selection, the default TA value applier (110c) applies the selected default TA to the random access procedure. Further, the PDCCH monitor (110g) monitors the PDCCH for the DCI for the RAR.

In an embodiment, the TA value determiner (110f) determines that the timing advance value is less than the default TA after calculating the RAR reception. Further, the TA value determiner (110f) considers the RACH failure and restarts the RACH procedure.

Although the FIG. 6b shows various hardware components of the processor (110) but it is to be understood that other embodiments are not limited thereon. In other embodiments, the processor (110) may include less or more number of components. Further, the labels or names of the components are used only for illustrative purpose and does not limit the scope of the invention. One or more components can be combined together to perform same or substantially similar function to handle the random access procedure.

Figure 6C:
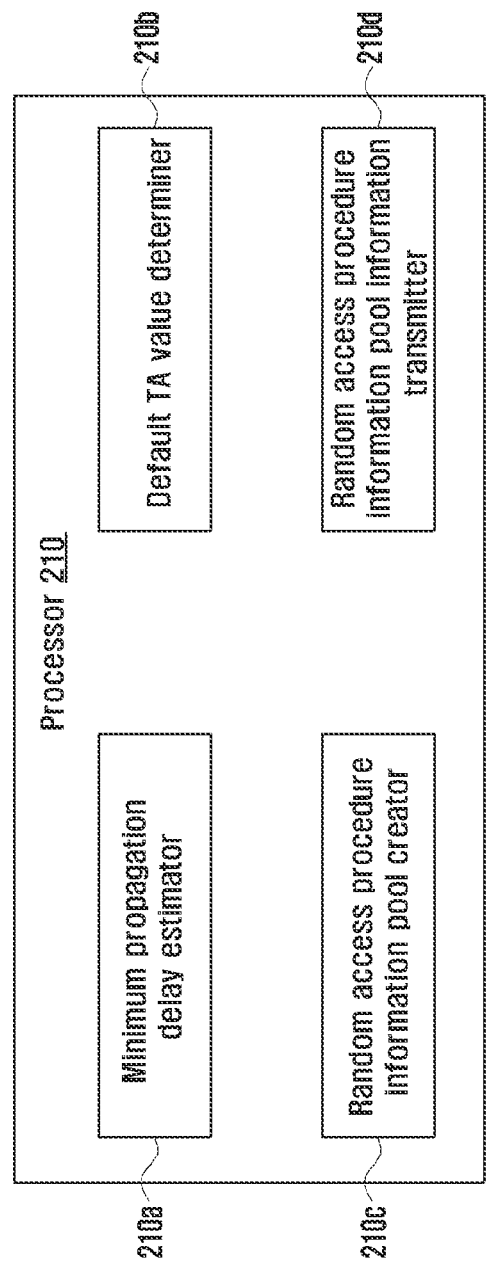
FIG. 6c illustrates various elements in a processor included in a base station, according to the embodiments as disclosed herein.

FIG. 6c illustrates various elements in the processor (210) included in the base station (200), according to the embodiments as disclosed herein. In an embodiment, the processor (210) includes a minimum propagation delay estimator (210a), a default TA value determiner (210b), a random access procedure information pool creator (210c), and a random access procedure information pool information transmitter (210d).

In an embodiment, the minimum propagation delay estimator (210a) is configured to estimates the minimum propagation delay using the at least one of altitude information and beam information. The default TA value determiner (210b) determines the default TA based on the minimum propagation delay. Further, the random access procedure information pool creator (210c) creates the pool of the RACH resource, the RACH preamble, the CP length associated with the RACH resource, and the GT length associated with the RACH resource based on the default TA value. Further, the random access procedure information pool information transmitter (210d) transmits the default TA and information to the UE (100) over the message.

Although the FIG. 6c shows various hardware components of the processor (210) but it is to be understood that other embodiments are not limited thereon. In other embodiments, the processor (210) may include less or more number of components. Further, the labels or names of the components are used only for illustrative purpose and does not limit the scope of the invention. One or more components can be combined together to perform same or substantially similar function to handle the random access procedure.

Figure 7:
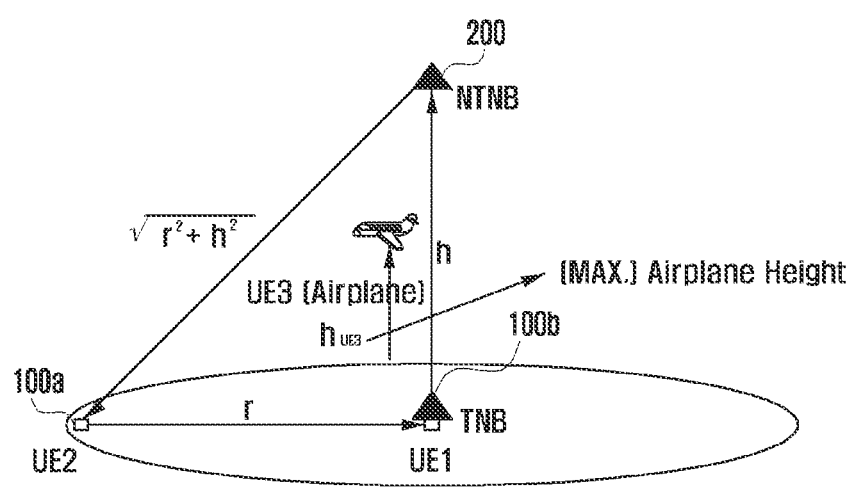
FIG. 7 is an example scenario in which the UE with the base station performs the random access procedure, according to the embodiments as disclosed herein.

FIG. 7 is an example scenario in which the UE (100) with the base station (200) performs the random access procedure, according to the embodiments as disclosed herein.

In an embodiment, the base station (200) estimates its height/altitude by using various mechanisms including but not limiting to a GPS, an altimeter, a barometer etc. and based on the height/altitude, the base station (200) does one or more of the following.

(I) In an embodiment, (a) the base station (200) estimates the minimum propagation delay using, at least in part, this altitude information from any possible UE (100) to the base station (200) and hence the minimum Timing Advance value (i.e., default TA). (b) Based on the estimated TA, the base station (200) creates a pool of the RACH resources with reduced CP, GT and RACH preambles with corresponding permitted cyclic shifts than the conventional RACH resources. (c) The base station (200) transmits (e.g. broadcast/multicast/unicast) the default TA that is configurable (or any other information that can help UE (100) to estimate default TA like altitude etc.) and other relevant information for random access (e.g. RAR window, RACH resource pool, CP length, GT lengths and the corresponding RACH preamble resources as calculated in point (I) (b). Further, the base station (200) uses at least one of the following to transmit the above information—MIB, any of the SIB, any other new message or RRC configuration.

The default TA (default TA refers to the Timing advance that the UE (100) can apply in first random access signal (e.g. PRACH preamble—msg1) itself without knowing the timing advance value from the base station (200) owing to a lot of factors including but not limiting to a guaranteed minimum delay.

(II) In another embodiment, (a) the base station (200) estimates the minimum propagation delay using, at least in part, this altitude information from any possible UE (100) at different altitudes to the base station (200) and hence the minimum Timing Advance value (i.e., default TA) for UE at different heights. This can include aerial UEs (like airplanes, UAVs, or the like) and can use information like maximum possible altitude for a set of UEs or their current altitude for this default TA estimation. (b) Based on the estimated TA, the base station (200) creates one or more pools of RACH resources with reduced CP and GT than the conventional RACH resources, for UE's at different heights, and RACH preambles with respective permitted cyclic shifts for each of these corresponding pools. (c) the base station (200) transmits the information about, one or more default TAs (or any other information that can help UE to estimate default TA like altitude etc.) and other relevant information for random access (e.g. UE types (e.g. depending different UE height, capability), the RAR window, the RACH resource pool, and CP and GT lengths for UE's at different heights and the corresponding and respective RACH preamble resources as calculated in point (II) (b). Further, the base station (200) uses one of the following to transmit the above information—MIB, any of the SIB, any other new message or RRC configuration.

(III) In another embodiment, (a) the base station (200) estimates the minimum propagation delay using, at least in part, this altitude information, from any possible UE (100) to the base station (200) corresponding to different beams, using parameters for beam area estimation and hence the minimum Timing Advance value (default TA) for different beams. (b) Based on the estimated TA, the base station (200) creates one or more pools of RACH resources with reduced CP and GT and RACH preambles with respective permitted cyclic shifts for each of these corresponding pools than the conventional RACH resources for different beams. (c) the base station (200) transmits the information about, one or more default TA (or any other information that can help UE to estimate default TA like altitude etc.), RACH resource pool, and CP and GT lengths corresponding to different beams and the corresponding and respective RACH preamble resources as calculated in point (III)(b). Further, the base station (200) uses one of the following to transmit the above information—MIB, any of the SIB, or any other new message or RRC configuration.

(IV) In another embodiment, (a) the base station (200) estimates the minimum propagation delay to the base station (200) using, at least in part, this altitude information from any possible UE (100) at different altitudes and corresponding to different beams and hence the minimum Timing Advance value (default TA) for the UE (100) at different heights and beams. (b) Based on the estimated TA, the base station (200) creates pools of RACH resources with reduced CP and GT than the conventional RACH resources, for UE's at different heights and beams and RACH preambles with respective permitted cyclic shifts for each of these corresponding pools. (c) the base station (200) transmits the information about, default TA (or any other information that can help UE to estimate default TA like altitude etc.) and other relevant information for random access (e.g. beam information, RACH resource pool, and CP and GT lengths for UE's at different heights and beams and the corresponding and respective RACH preamble resources as calculated in point (IV) (b). Further, the base station (200) uses one of the following to transmit the above information—MIB, any of the SIB, any other new message or RRC configuration.

As a consequence of application of default TA by the UE (100), CP and GT of RACH preamble can be reduced and can be designed according to the differential delay between maximum and minimum propagation delay, rather than maximum propagation delay in the conventional RACH.

In another embodiment, the base station (200) creates one or more of the following mappings/lists and indicates then to the UE (100) via MIB, any of the SIB, any other new message or RRC configuration. The lists are a list of default TA to intervals of height (with static/semi-static/configurable granularity) mapping, a list of default TA/RACH resources/RACH preamble structure to SSB mappings and a list of default TA/RACH resources/RACH preamble structure to CSI-RS mappings.

In another embodiment, the UE (100) acquires synchronization timing from downlink reference signal and random access information including default TA (or any parameter helpful in estimating it like altitude etc.). Further, the UE sends random access signal applying default TA (i.e. UE transmit msg1 earlier based on default TA value than the conventional msg1 transmission timing (default TA equal to 0). Further, the UE follows the remaining random access procedure (e.g. msg2/3/4) either conventionally or in accordance with procedures specified in clause 6/clause 9 (either one or both can be used).

In another embodiment, the UE (100) acquires synchronization timing from downlink reference signal and relevant random access information including one or more default TAs (or any parameter helpful in estimating it like altitude etc.) and corresponding pools. Further, the UE (100) selects random access resource pool based on selection criteria (e.g. UE type, beam, height, location, velocity) and sends the random access signal applying the corresponding default TA in that resource pool TA (i.e. UE transmit msg1 earlier based on default TA value than the conventional msg1 transmission timing (default TA equal to 0). Further, the UE (100) follows the remaining random access procedure (e.g. msg2/3/4) either conventionally or in accordance with procedures specified in clause 6/clause 9 (either one or both can be used).

In another embodiment, the base station (200) will calculate the timing advance for the UE (100) and transmits the same in the RAR. The UE (100) will calculate its accurate timing advance by setting it equal to the value received in RAR. In another embodiment, the base station (200) calculates the timing advance for the UE (100) and transmits only the incremental change over the default timing advance as part of RAR. The UE (100) will calculate its accurate timing advance by setting it equal to sum of the value received in RAR and its default timing advance.

In another embodiment, based on the default TA provided in response to determining that the height of the UE (100) is not available and the beam information is available, the UE (100) shall wait for a duration T before starting the ra-ResponseWindow/bfr-ResponseWindow and monitors the PDCCH for DCI for RAR. The Time T can be a function (static/semi-static/RRC configurable/MAC CE based configurable) of default TA or can be transmitted separately by NB in (MIB/SIB/or any other new message).

In another embodiment, if the Accurate Timing advance value calculated after RAR reception is less than the default TA value determined in response to determining that the height of the UE (100) is not available and the beam information is available, the UE (300) shall consider RACH failure and restart the RACH procedure.

In another embodiment, after determining TA using either default TA as determined in response to determining that the height of the UE and the beam information are not available, or using its position information, the UE (100) can still choose to perform RACH procedure using conventional RACH resources without applying any default TA. If the Accurate Timing advance value calculated after RAR reception differs from the TA value determined by a margin either larger than the error boundary or any static/semi-static parameter of UE's choice, the UE (100) shall consider RACH failure and restart the RACH procedure.

In another embodiment, based on the accurate timing advance value calculated after RAR reception. The UE (100) shall wait for duration T before starting the ra-ContentionResolutionTimer and monitors the PDCCH for DCI corresponding to its C-RNTI/TC-RNTI (TS 3.321/38.321). The UE (100) shall stop ra-ContentionResolutionTimer/PDCCH Monitoring on every Msg3 retransmission and restart it after duration T. The Time T can be equal to default TA or can be a function (static/semi-static/RRC configurable/MAC CE based configurable) of default TA or can be transmitted separately by NB in (MIB/SIB/RAR/or any other new message).

In another embodiment, on timeAlignmentTimer expiry, the UE (100) can utilize the same RACH resource/RACH configuration/default TA as determined in response to determining that the height of the UE and the beam information are not available or in response to determining that the height of the UE (100) is not available and the beam information is available during previous RACH, to perform RACH again. The UE (100) can perform the procedure specified in response to determining that the height of the UE and the beam information are not available or in response to determining that the height of the UE (100) is not available and the beam information is available, again to determine the RACH resource/RACH configuration/default TA required for RACH. The UE (100) can use the RACH resource/RACH configuration/default TA indicated by network semi-statically, or by RRC-configuration, or MAC CE based configuration.

Figure 8:
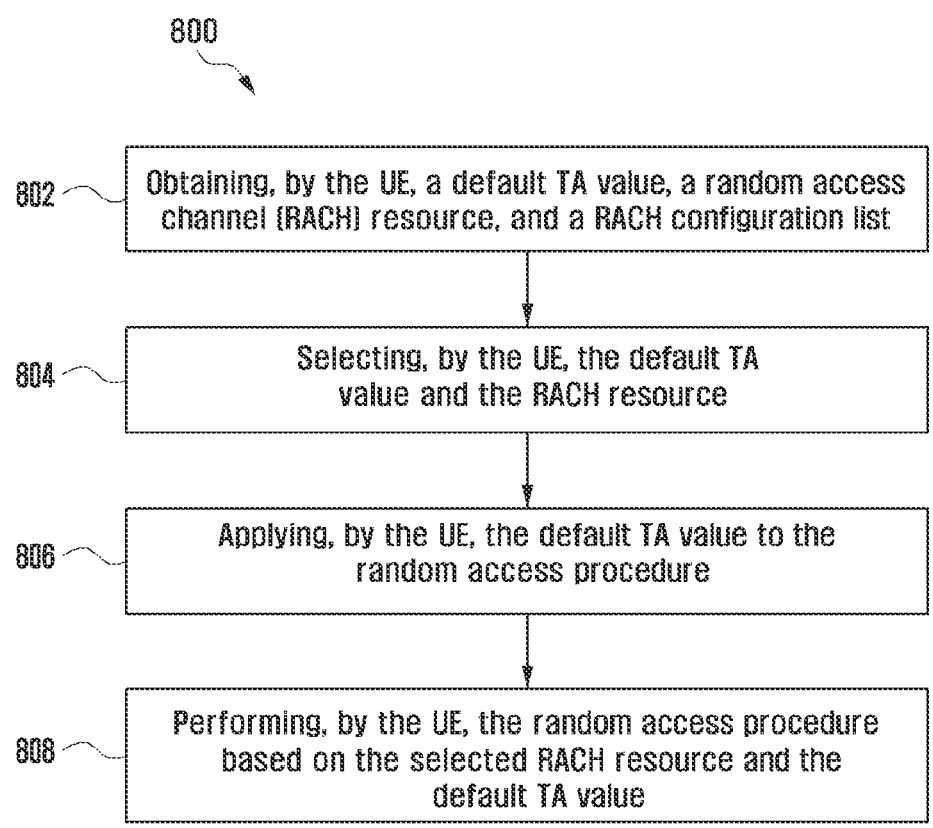
FIG. 8 is a flow chart illustrating a method, implemented by the UE, for handling the random access procedure in the Non-Terrestrial communication system, according to the embodiments as disclosed herein.

FIG. 8 is a flow chart 800 illustrating a method for handling the random access procedure in the Non-Terrestrial communication system (300), according to the embodiments as disclosed herein. The operations (802-808) are performed by the processor (110). At 802, the method includes obtaining the default TA, the RACH) resource, and the RACH configuration list. At 804, the method includes selecting the default TA and the RACH resource. At 806, the method includes applying the selected default TA to the random access procedure. At 808, the method includes performing the random access procedure based on the selected RACH resource and the selected default TA.

Figure 9A:
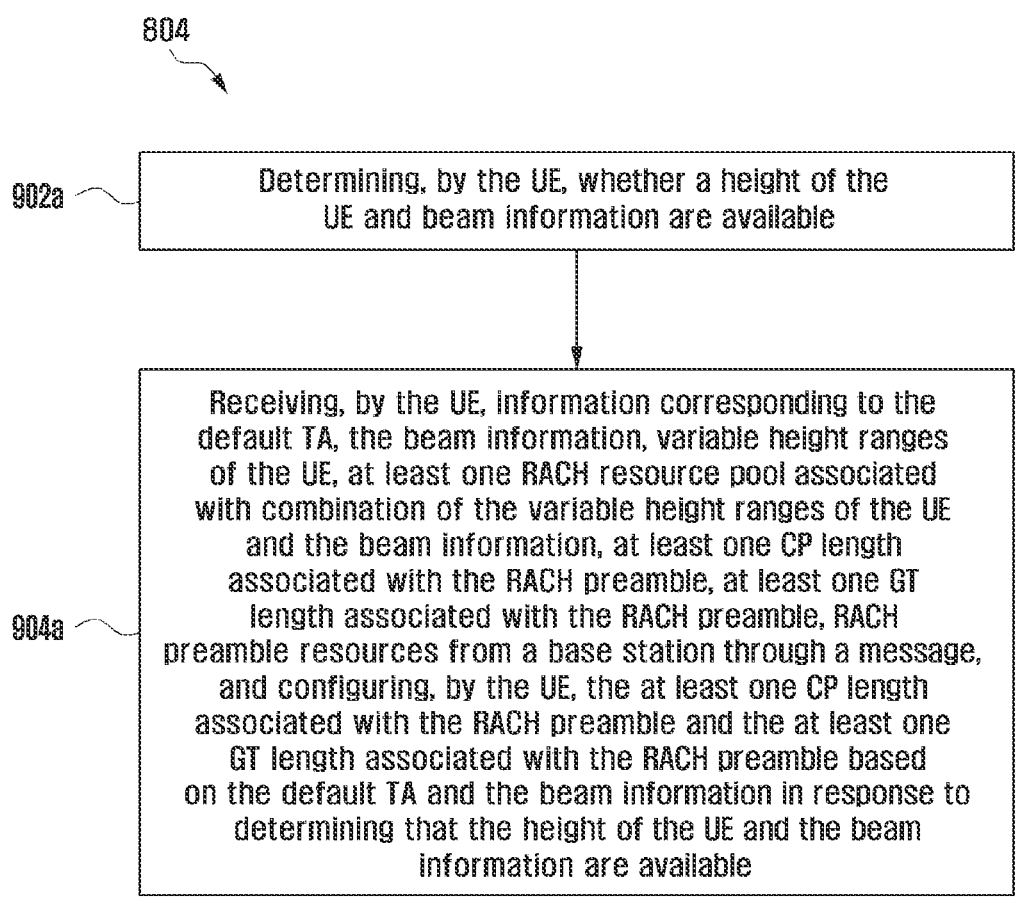
FIG. 9a is a flow chart illustrating various process for selecting the default TA and the RACH resource, when the height of the UE and the beam information are available, according to the embodiments as disclosed herein.

FIG. 9a is a flow chart 804 illustrating various process for selecting the default TA and the RACH resource, when the height of the UE (100) and the beam information are available, according to the embodiments as disclosed herein. The operations (902a-904a) are performed by the processor (110).

At 902a, the method includes determining whether the height of the UE (100) and beam information are available. At 904a, the method includes receiving the information corresponding to the default TA, the beam information, the variable height ranges of the UE (100), the at least one RACH resource pool associated with combination of the variable height ranges of the UE (100) and the beam information, the CP length associated with the RACH preamble, the GT length associated with the RACH preamble, and the RACH preamble resources from the base station (200) through the message, and configuring the CP length associated with the RACH preamble and the GT length associated with the RACH preamble based on the default TA and the combination of the variable height ranges of the UE (100) and the beam information in response to determining that the height of the UE (100) and the beam information are available.

Figure 9B:
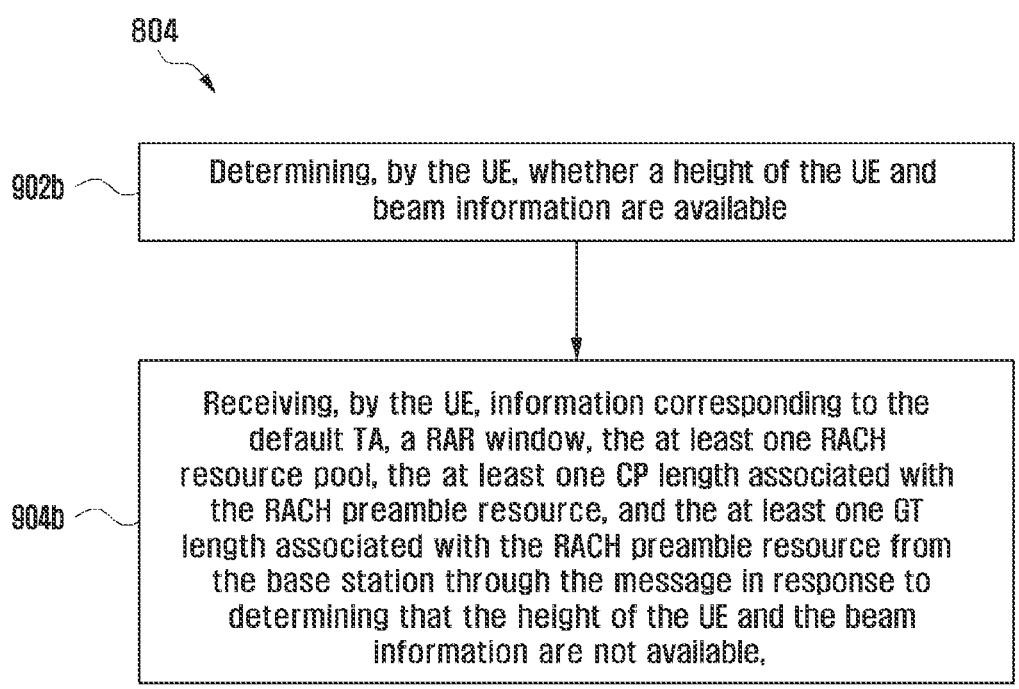
FIG. 9b is a flow chart illustrating various process for selecting the default TA and the RACH resource, when the height of the UE and the beam information are not available, according to the embodiments as disclosed herein.

FIG. 9b is a flow chart 804 illustrating various process for selecting the default TA and the RACH resource, when the height of the UE (100) and the beam information are not available, according to the embodiments as disclosed herein. The operations (902b-904b) are performed by the processor (110).

At 902b, the method includes determining whether the height of the UE (100) and beam information are available. At 904b, the method includes receiving information corresponding to the default TA, the RAR window, the RACH resource pool, the CP length associated with the RACH preamble resource, and the GT length associated with the RACH preamble resource from the base station (200) through the message in response to determining that the height of the UE (100) and the beam information are not available.

Figure 9C:
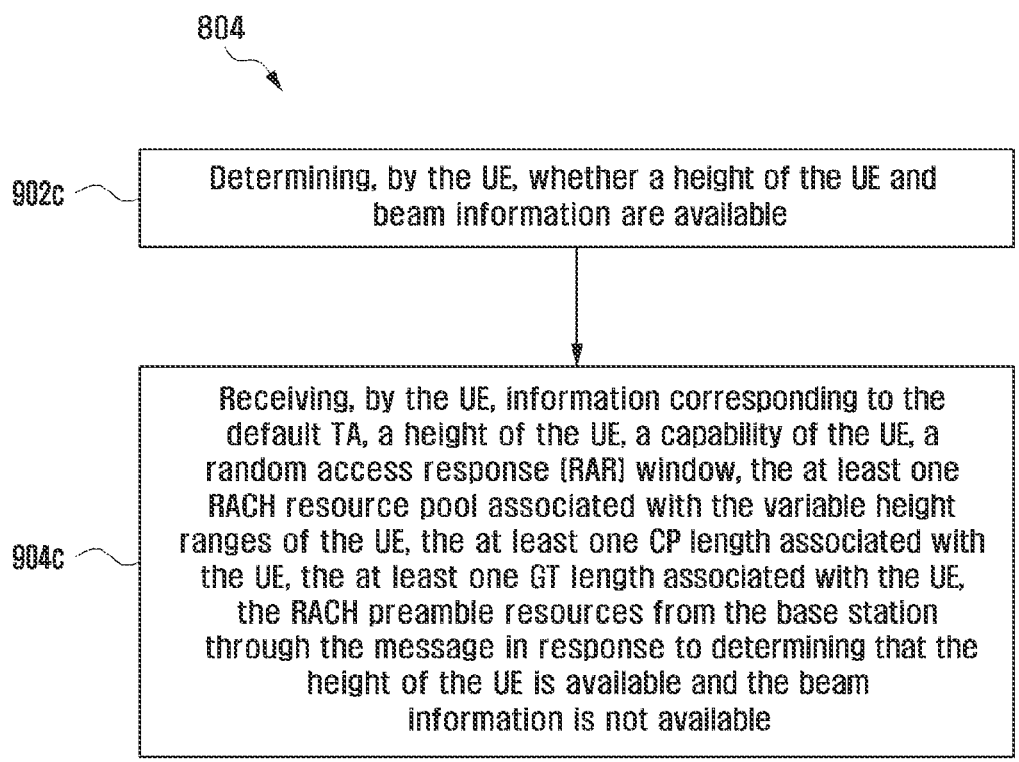
FIG. 9c is a flow chart illustrating various process for selecting the default TA and the RACH resource, when the height of the UE is available and the beam information is not available according to the embodiments as disclosed herein.

FIG. 9c is a flow chart 804 illustrating various process for selecting the default TA and the RACH resource, when the height of the UE (100) is available and the beam information is not available according to the embodiments as disclosed herein. The operations (902c-904c) are performed by the processor (110).

At 902c, the method includes determining whether the height of the UE (100) and beam information are available. At 904c, the method includes receiving information corresponding to the default TA, the height of the UE (100), the capability of the UE (100), the RAR window, the at least one RACH resource pool associated with the variable height ranges of the UE (100), the CP length associated with the UE (100), the GT length associated with the UE (100), the RACH preamble resources from the base station (200) through the message in response to determining that the height of the UE (100) is available and the beam information is not available.

Figure 9D:
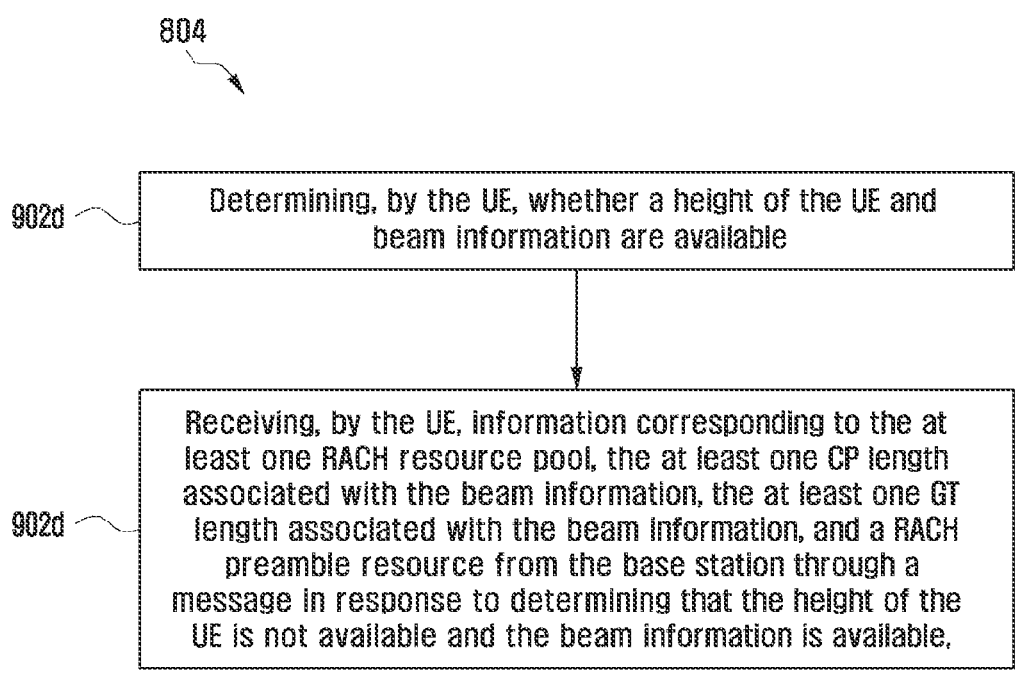
FIG. 9d is a flow chart illustrating various process for selecting the default TA and the RACH resource when the height of the UE is not available and the beam information is available, according to the embodiments as disclosed herein.

FIG. 9d is a flow chart 804 illustrating various process for selecting the default TA and the RACH resource when the height of the UE (100) is not available and the beam information is available, according to the embodiments as disclosed herein. The operations (902d-904d) are performed by the processor (110).

At 902d, the method includes determining whether the height of the UE (100) and the beam information are available. At 904d, the method includes receiving the information corresponding to the default TA, the RACH resource pool, the CP length associated with the beam information, the GT length associated with the beam information, and the RACH preamble resource from the base station (200) through the message in response to determining that the height of the UE (100) is not available and the beam information is available.

Figure 10:
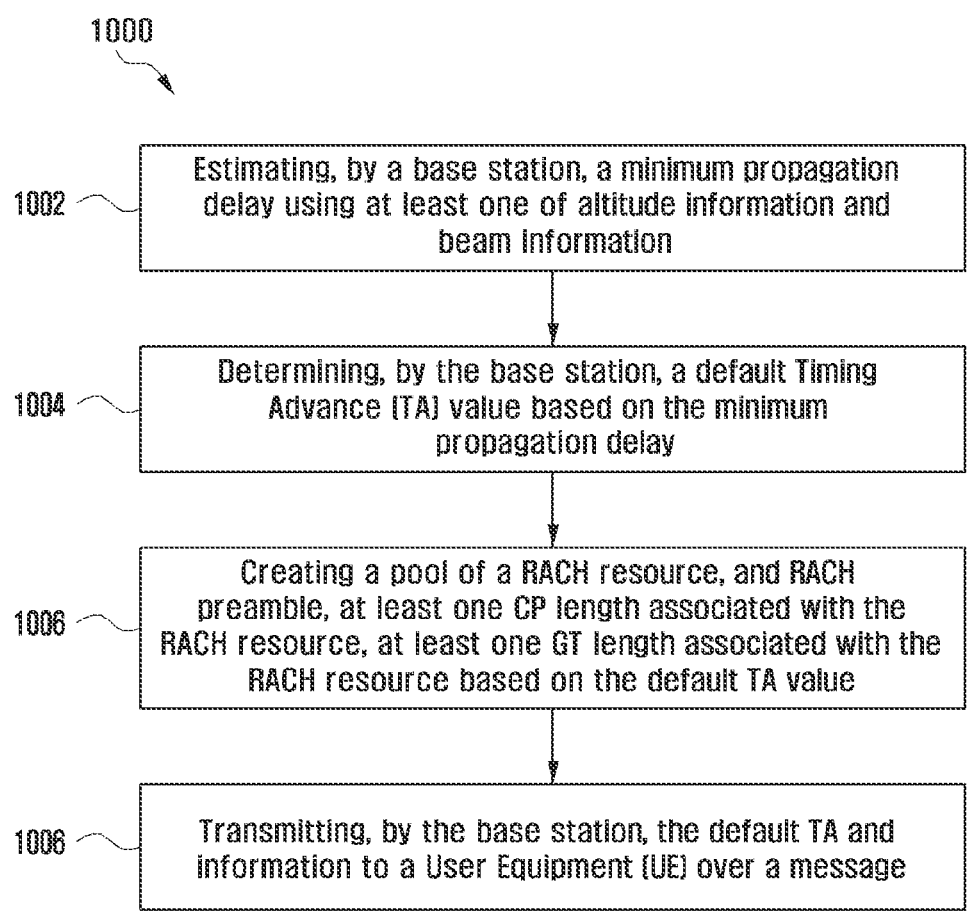
FIG. 10 is flow chart illustrating a method, implemented by the base station, for handling the random access procedure in the Non-Terrestrial communication system, according to the embodiments as disclosed herein.

FIG. 10 is flow chart illustrating a method for handling the random access procedure in the Non-Terrestrial communication system (300), according to the embodiments as disclosed herein. The operations (1002a-1002d) are performed by the processor (210). At 1002, the method includes estimating the minimum propagation delay using at least one of altitude information and beam information. At 1004, the method includes determining the default TA based on the minimum propagation delay, At 1006, the method includes creating the pool of the RACH resource, the RACH preamble, the CP length associated with the RACH resource, and the GT length associated with the RACH resource based on the default TA value. At 1008, the method includes transmitting the default TA and information to the UE (100) over the message.

The various actions, acts, blocks, steps, or the like in the flow diagrams 800, 804 and 1000 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for handling a random access procedure in a non-terrestrial communication system, the method comprising:
obtaining, by a user equipment (UE), a default timing advance (TA), a random access channel (RACH) resource, and a RACH configuration list;
selecting, by the UE, the default TA and the RACH resource;
applying, by the UE, the selected default TA to the random access procedure; and performing, by the UE, the random access procedure based on the selected RACH resource and the selected default TA,
wherein selecting, by the UE, the default TA and the RACH resource comprises:
determining, by the UE, whether a height of the UE and beam information are available,
in response to determining that the height of the UE and the beam information are available:
receiving, by the UE, information corresponding to the default TA, beam information, variable height ranges of the UE, at least one RACH resource pool associated with a combination of the variable height ranges of the UE and the beam information, at least one a cyclic prefix (CP) length associated with a RACH preamble, at least one guard time (GT) length associated with the RACH preamble, RACH preamble resources from a base station through a message, and
configuring, by the UE, the at least one CP length associated with the RACH preamble and the at least one GT length associated with the RACH preamble based on the default TA and the combination of the variable height ranges of the UE and the beam information, and
selecting, by the UE, the default TA and the RACH resource based on the determination.

2. The method of claim 1, wherein selecting, by the UE, the default TA and the RACH resource comprises:
determining, by the UE, whether a height of the UE and beam information are available;
in response to determining that the height of the UE and the beam information are not available, receiving, by the UE, information corresponding to the default TA, a random access response (RAR) window, at least one RACH resource pool, at least one CP length associated with the RACH resource, and at least one guard time (GT) length associated with the RACH resource from a base station through a message; and
selecting, by the UE, the default TA and the RACH resource based on the determination.

3. The method of claim 1, wherein selecting, by the UE, the default TA and the RACH resource comprises:
determining, by the UE, whether a height of the UE and beam information are available;
in response to determining that the height of the UE is available and the beam information is not available, receiving, by the UE, information corresponding to the default TA, the height of the UE, a capability of the UE, a random access response (RAR) window, at least one RACH resource pool associated with variable height ranges of the UE, at least one CP length associated with the UE, at least one guard time (GT) length associated with the UE, RACH preamble resources from a base station through a message; and
selecting, by the UE, the default TA and the RACH resource based on the determination.

4. The method of claim 1, wherein the message comprises at least one of a master information block (MIB), a system information block (SIB), and a radio resource control (RRC) configuration message.

5. The method of claim 1, further comprises:
waiting, by the UE, a predefined time prior to initiate a response window based on the default TA; and
monitoring, by the UE, a physical downlink control channel (PDCCH) for a downlink control information (DCI) for a random access response (RAR).

6. The method of claim 1, further comprises:
determining, by the UE, that a timing advance value is less than the default TA after calculating a random access response (RAR) reception;
considering, by the UE, a RACH failure; and
restarting, by the UE, a RACH procedure.

7. The method of claim 1, further comprises:
waiting, by the UE, for a time duration prior to starting a timer based on a timing advance value calculated after a random access response (RAR) reception based on the default TA;
monitoring, by the UE, a physical downlink control channel (PDCCH) for downlink control information (DCI), wherein the PDCCH corresponds to a cell-radio network temporary identifier (C-RNTI) or a temporary cell-radio network temporary identifier (TC-RNTI); and
stopping, by the UE, the timer and PDCCH monitoring based on the monitoring.

8. The method of claim 1, wherein selecting, by the UE, the default TA and the RACH resource comprises:
acquiring, by the UE, a synchronization timing from a downlink reference signal and random access information including the default TA;
sending, by the UE, the random access information using the default TA; and
selecting, by the UE, the default TA and the RACH resource based on the random access information.

9. The method of claim 1, wherein selecting, by the UE, the default TA and the RACH resource comprises:
mapping one of a list of default TA, the RACH configuration list, and a list of RACH preamble structure to one of synchronization signal block (SSB) information and a channel state information reference signal (CSI-RS); and
selecting, by the UE, the default TA and the RACH resource based on the mapping.

10. The method of claim 1, wherein selecting, by the UE, the default TA and the RACH resource comprises:
computing the default TA based on a TA value received from a base station during a random access response (RAR) previously received from the base station; and
selecting, by the UE, the default TA and the RACH resource based on the computation, wherein the default TA is computed based on the RAR which is indicated to neighboring UE for the random access procedure via a device to device communication.

11. A user equipment (UE) for handling a random access procedure in a non-terrestrial communication system, the UE comprising:
a memory; and
a processor, coupled with the memory, configured to:
obtain a default timing advance (TA), a random access channel (RACH) resource, and a RACH configuration list;
select the default TA and the RACH resource;
apply the selected default TA to the random access procedure; and
perform the random access procedure based on the selected RACH resource and the selected default TA,
wherein, in order to select the default TA and the RACH resource, the processor is further configured to:
determine whether a height of the UE and beam information are available;
in response to a determination that the height of the UE and the beam information are available;

receive information corresponding to the default TA, beam information, variable height ranges of the UE, at least one RACH resource pool associated with a combination of the variable height ranges of the UE and the beam information, at least one a cyclic prefix (CP) length associated with a RACH preamble, at least one guard time (GT) length associated with the RACH preamble, RACH preamble resources from a base station through a message, and configure the at least one CP length associated with the RACH preamble and the at least one GT length associated with the RACH preamble based on the default TA and the combination of the variable height ranges of the UE and the beam information; and select the default TA and the RACH resource based on the determination.

12. The method of claim 2, wherein the message comprises at least one of a master information block (MIB), a system information block (SIB), and a radio resource control (RRC) configuration message.

13. The method of claim 2, wherein the message comprises at least one of a master information block (MIB), a system information block (SIB), and a radio resource control (RRC) configuration message.

* * * * *